US011235331B2

(12) United States Patent
Lutnesky et al.

(10) Patent No.: US 11,235,331 B2
(45) Date of Patent: Feb. 1, 2022

(54) FUNCTIONALLY VERSATILE CASSETTES

(71) Applicant: HEWLETT-PACKARD DEVELOPMENT COMPANY, L.P., Spring, TX (US)

(72) Inventors: Gary G. Lutnesky, Corvallis, OR (US); Dennis R. Esterberg, Corvallis, OR (US); Matthew David Smith, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 265 days.

(21) Appl. No.: 16/473,352

(22) PCT Filed: Feb. 3, 2017

(86) PCT No.: PCT/US2017/016449
§ 371 (c)(1),
(2) Date: Jun. 25, 2019

(87) PCT Pub. No.: WO2018/144012
PCT Pub. Date: Aug. 9, 2018

(65) Prior Publication Data
US 2019/0321826 A1 Oct. 24, 2019

(51) Int. Cl.
*B01L 3/00* (2006.01)
*B01L 9/00* (2006.01)
*G01N 35/10* (2006.01)

(52) U.S. Cl.
CPC .............. *B01L 3/527* (2013.01); *B01L 9/52* (2013.01); *G01N 35/10* (2013.01); *G01N 35/1002* (2013.01); *B01L 2200/0605* (2013.01); *B01L 2200/14* (2013.01); *B01L 2300/06* (2013.01); *G01N 2035/1034* (2013.01)

(58) Field of Classification Search
None
See application file for complete search history.

(56) References Cited

U.S. PATENT DOCUMENTS

| 5,200,580 A | 4/1993 | Sienski |
| 7,643,202 B2 | 1/2010 | Sasagawa |
| 9,240,377 B2 | 1/2016 | Qian et al. |
| 9,433,939 B2 | 9/2016 | Dudenhoefer et al. |

(Continued)

FOREIGN PATENT DOCUMENTS

| TW | I415238 | 11/2013 |
| TW | I548889 | 9/2016 |

(Continued)

OTHER PUBLICATIONS

Yang, H.S. et al.; "3D Integration of CMOS and MEMS Using Mechanically Flexible Interconnects (MFI) and Through Silicon Vias (TSV)"; Jun. 2010, http://ieeexplore.ieee.org/abstract/document/5490716/.

*Primary Examiner* — Kathryn Wright
(74) *Attorney, Agent, or Firm* — Fabian VanCott

(57) ABSTRACT

A fluid ejection device may include a blank cassette that includes a substrate, a die coupled to the substrate, a number of assigned electrical traces formed on the substrate, and a number of unassigned electrical traces formed on the substrate. At least one wirebond may couple at least one of the unassigned electrical traces to the die thereby assigning at least one function to the fluid ejection device.

19 Claims, 15 Drawing Sheets

(56) References Cited

U.S. PATENT DOCUMENTS

| | | |
|---|---|---|
| 2008/0129781 A1 | 6/2008 | Furukawa |
| 2010/0141713 A1* | 6/2010 | Hoisington .......... B41J 2/14233 347/68 |
| 2011/0115852 A1* | 5/2011 | Bibl ........................ B41J 2/135 347/50 |
| 2014/0055528 A1 | 2/2014 | Bibl et al. |
| 2014/0061642 A1 | 3/2014 | Srinivas et al. |

FOREIGN PATENT DOCUMENTS

| | | |
|---|---|---|
| TW | I583956 | 5/2017 |
| WO | WO-2011107612 | 9/2011 |
| WO | WO-2017171801 | 10/2017 |

* cited by examiner

FUNCTIONALLY VERSATILE CASSETTES

BACKGROUND

An "assay run" is an investigative or analytic event used in, for example, laboratory medicine, pharmacology, analytical chemistry, environmental biology, or molecular biology, for qualitatively assessing or quantitatively measuring the presence, amount, or the functional activity of a sample. The sample may be a drug, a genomic sample, a proteomic sample, a biochemical substance, a cell in an organism, an organic sample, or other inorganic and organic chemical samples. An assay run may measure an intensive property of the sample and express it in the relevant measurement unit such as, for example, molarity, density, functional activity in enzyme international units, degree of some effect in comparison to a standard, among other measurable characteristics. An assay may involve reacting a sample with a number of reagents, and may be classified as an instance of an assay procedure conforming to an assay protocol. An assay protocol may involve a set of reagent and/or sample fluids being dispensed in specific amounts to a number of assay reaction sites such as wells within an assay plate. Further, an assay protocol may include additional processing such as mixing, separation, heating or cooling, incubation, and eventually at least one read-out. The reproducibility and run-to-run comparability of an assay depends on the reproduction of its protocol.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
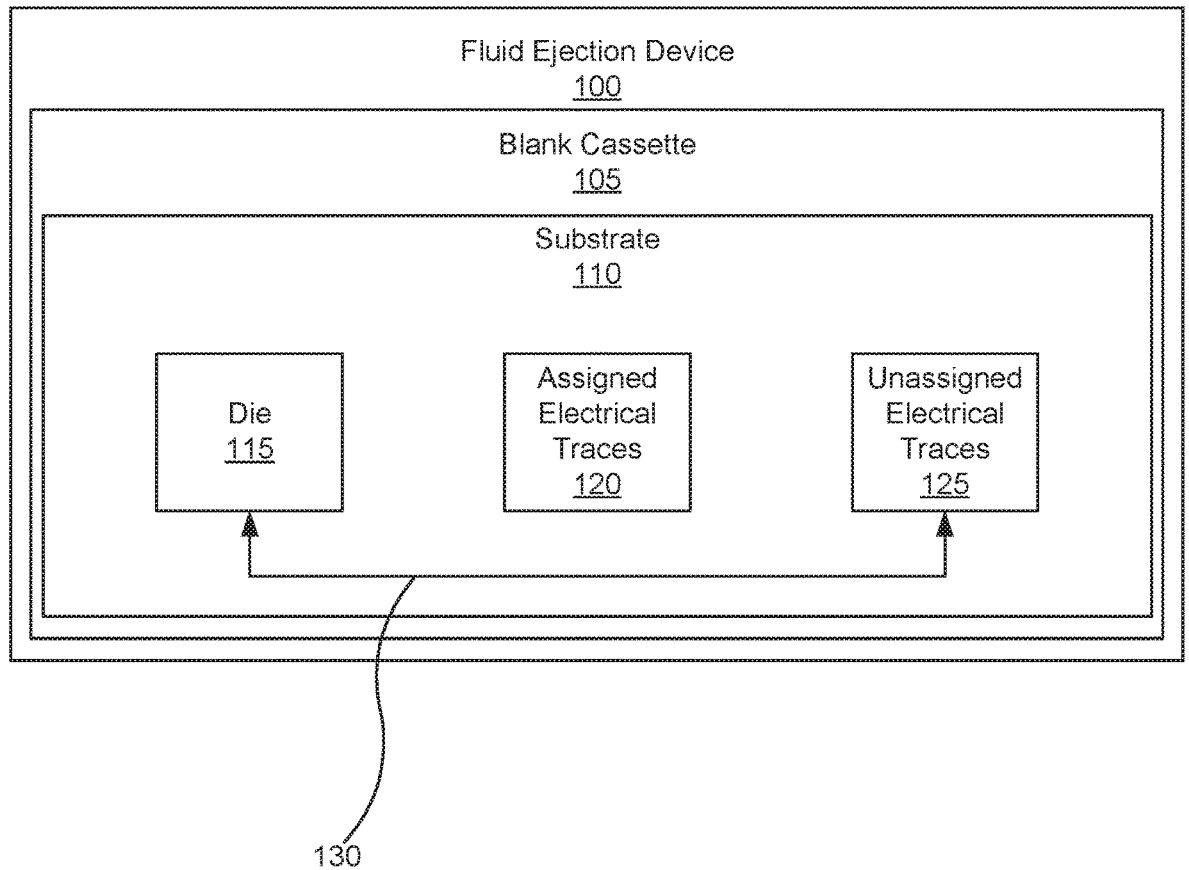
FIG. 1 is a block diagram of a fluid ejection device according to an example of the principles described herein.

Assay runs as described above have been done by hand using, for example a pipette. In order to complete the assay, a user may selectively take a sample using the pipette and eject a metered amount of the sample into individual wells of an assay plate. This is all done by hand and has proven to be time consuming. Additionally, because a human is ejecting the samples into the individual wells of the assay plate, mistakes may be made and an extra amount of the sample may be added to any particular well or a portion of sample may not be added at all.

To place user interaction to a minimum, automated assay fluid dispensing systems have been developed that may dispense assay fluids, e.g., samples and reagents, in a precise, controlled fashion to multiple reaction sites within an assay plate in a short time. For example, a carefully formulated mixture of several reagents, including a target species of interest, may be carefully formulated at multiple reaction sites for the testing of a set of test sample reagents at multiple concentrations. This allows many reactions to proceed contemporaneously. The automation reduces user effort and user-caused variability, while the concurrency further reduces the time to complete a complex assay.

The automated assay fluid dispensing systems may interface with, for example, a fluid ejection device that in the form of a cassette. When the user interfaces the cassette with the automated assay fluid dispensing system, the system may direct the cassette to eject a fluid through a die coupled to the cassette. The ejection of the fluid by the die allows for a quick, accurate, and reliable process of completing an assay.

In an example, the present specification, describes a fluid ejection device that includes a blank cassette that includes a substrate, a die coupled to the substrate, a number of assigned electrical traces formed on the substrate, and a number of unassigned electrical traces formed on the substrate. At least one wirebond may couple at least one of the unassigned electrical traces to the die thereby assigning at least one function to the fluid ejection device.

In an example, the fluid ejection device may include a first wirebond of the at least one wirebond coupled between a first die pad of the die and a first unassigned trace provides a first function different from the first wirebond of the at least one wirebond coupled between the first die pad of the die and a second unassigned trace. Additionally, or alternatively, the fluid ejection device may include a first wirebond of the at least one wirebond coupled between a first die pad of the die and a first unassigned trace provides a first function different from second wirebond of the at least one wirebond coupled between a second die pad of the die and a second unassigned trace.

Additionally, or alternatively, the fluid ejection device may include at least two unassigned electrical traces being coupled with the at least one wirebond to form a connect detect verifying that the electrical traces are coupled to control logic.

Additionally, or alternatively, the fluid ejection device may include a number of assigned electrical traces coupled to control logic via at least one wirebond.

The present specification further describes a method of forming a cassette that includes forming at least one dispense head including forming a monolithic substrate, coupling a fluid ejection die to the substrate, forming a number of assigned traces on the substrate, forming a number of unassigned traces on the substrate, and electrically coupling at least one of the unassigned electrical traces to the fluid ejection die assigning at least one function to the cassette.

In an example, the method of forming a cassette may include electrically coupling each of the number of the assigned traces to a die pad of the fluid ejection die based on an assigned function of the cassette with regard to the respective assigned traces.

Additionally, or alternatively, the method of forming a cassette may include electrically coupling at least one of the unassigned electrical traces to the fluid ejection die including electrically coupling at least one of the unassigned electrical traces to a die pad of the fluid ejection die based on a target function of the cassette.

Additionally, or alternatively, the method of forming a cassette may include using laser direct structuring (LDS) to form the assigned and unassigned traces.

Additionally, or alternatively, the method of forming a cassette may include mounting a plurality of dispense heads within a frame.

Additionally, or alternatively, the method of forming a cassette may include wirebonding at least two of the plurality of dispense heads to provide at least two different functions to their respective dispense heads. In this example, the method of forming a cassette may also include mounting the at least two of the plurality of dispense heads within a frame.

The present specification further describes a system for ejecting a fluid into an assay including a blank cassette including at least one dispense head including a substrate, a die coupled to the substrate, a number of assigned electrical traces formed on the substrate, a number of unassigned electrical traces formed on the substrate, and at least one wirebond coupling at least one of the unassigned electrical traces to the die assigning at least one function to the fluid ejection device wherein the system further includes a controller communicatively coupled to the die to instruct the die to eject an amount of the fluid.

In an example, a plurality of dispense heads may be included within the system with the dispense heads being integrated into a frame.

Additionally, or alternatively, a first wirebond of the at least one wirebond coupled between a first die pad of the die and a first unassigned trace provides a first function to the cassette different from the first wirebond of the at least one wirebond coupled between the first die pad of the die and a second unassigned trace.

Additionally, or alternatively, a first wirebond of the at least one wirebond coupled between a first die pad of the die and a first unassigned trace provides a first function different from second wirebond of the at least one wirebond coupled between a second die pad of the die and a second unassigned trace.

As used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may or may not be included in other examples.

FIG. 1 is a block diagram of a fluid ejection device (100) according to an example of the principles described herein. The fluid ejection device (100) may include a blank cassette (105). The blank cassette (105) may include a substrate (110), a die (115) coupled to the substrate (110), a number of assigned electrical traces (120) formed on the substrate (110), and a number of unassigned electrical traces (125) also formed on the substrate (110). The fluid ejection device (100) may further include at least one wirebond (130) coupling at least one of the unassigned electrical traces (125) to the die (115) thereby assigning at least one function to the fluid ejection device (100).

As used in the present specification and in the appended claims, the term "blank cassette" is meant to be understood as a cassette that includes the assigned electrical traces (120) and unassigned electrical traces (125) but does not yet include any wirebonds electrically coupling either the assigned electrical traces (120) or unassigned electrical traces (125) to the die (115).

The substrate (110) may be any monolithic piece of material onto which the die (115) is coupled and the assigned electrical traces (120) and unassigned electrical traces (125) are formed. In an example, the substrate (110) may be made of a thermoplastic material. A reservoir with a fluid aperture defined in the reservoir may be formed on the substrate (110). The fluid aperture allows for an assay fluid to move from one side of the substrate (110) to another. The substrate (110) may include a handle to allow a user to touch, pick up, and move the blank cassette (105) without contaminating the reservoir or an assay fluid deposited therein.

The die (115) may be coupled to the substrate (110) opposite the reservoir on the substrate (110) and in line with the fluid aperture. In one example, the die (115) may be, for example, a microelectromechanical system (MEMs) device. In another example, the die may be a device that ejects fluid therefrom using, for example, a piezoelectric device or thermal resistive device.

The reservoir is fluidically coupled to the die (115) by the fluid aperture so that the assay fluid may be introduced to the die (115) to allow the die (115) to eject the assay fluid into a number of the wells of the well plate as instructed by, for example, an assay fluid dispensing system.

The assigned electrical traces (120) and unassigned electrical traces (125) may be formed along any surface of the substrate (110) and may electrically couple the die (115) to a number of contact pads also defined on the substrate (110). The assigned electrical traces (120), unassigned electrical traces (125), and contact pads may be formed on the substrate (110) using, for example, a laser direct structuring (LDS) process. In this example, the substrate (110) may be made of a thermoplastic material that has been doped with a non-conductive, metallic, inorganic compound. A laser may etch a number of portions of the thermoplastic material at locations on the substrate (110) where the assigned electrical traces (120), unassigned electrical traces (125), and contact pads are to be formed. In so doing, the non-conductive, metallic, inorganic compound is exposed. The substrate (110) may then be dipped into, for example, a copper bath where the copper attracts to the non-conductive, metallic, inorganic compounds and forms that assigned electrical traces (120), unassigned electrical traces (125), and contact pads.

In an example, the electrical components of the examples of the blank cassette (105) including the contact pads, the vias, the traces, and the wirebonds (130) may be formed using a deposition process where a conductive material is deposited on the substrate (110). In this example, the conductive material may be deposited using, for example, a three-dimensional (3D) printing device.

The assigned electrical traces (120) are those traces that interface with a number of connections of an assay fluid dispensing system and are designed to allow the assay fluid dispensing system to interface with the die (115) in an assigned manner. For example, the assigned electrical traces (120) may be connected to a number of contact pads that have been assigned the following functions: Ground and/or an Assignable; Data; Clock; Fire; Assignable; VDD (source voltage); Ground; and Thermal Sense Resistor (TSR), among others. The examples of contact pad assignments described herein is meant merely as an example, and other contact pad assignments to which the assigned electrical traces (120) are associated with may be made.

During manufacture of the blank cassette (105) of the fluid ejection device (100), the assigned electrical traces (120) may not be electrically coupled to the die (115) using a number of wirebonds (130). Instead, the assigned electrical traces (120) may be assigned according to the above contact pad assignment as dictated by the assay fluid dispensing system. However, after the blank cassette (105) has been formed, the completion of the assignment of the assigned electrical traces (120) may be made by connecting the assigned electrical traces (120) to particular die pads defined on the die (115). The connection is made using a wirebond for each of the assigned electrical traces (120).

The unassigned electrical traces (125) are those traces that remain unassigned after the formation of the blank cassette (105). The unassigned electrical traces (125) are unassigned because if wirebonded to the die (115), additional functionality may be realized in the blank cassette (105). Specifically, if the unassigned electrical traces (125) are never electrically connected to the die (115), the assay fluid dispensing system may detect this and provide no signals to the unassigned electrical traces (125) and their respective contact pads defined on the substrate (110). In this example, the assigned electrical traces (120) may continue to function as described above and continue to allow the assay fluid dispensing system to send signals to the die (115) to allow for, at least, the ejection of the fluid from the fluid ejection device (100).

However, if the unassigned electrical traces (125) are eventually coupled to the die (115) using a wirebond (130), the assay fluid dispensing system may detect this connection via, for example, a signal request. Signals may then be sent to the die (115) by the assay fluid dispensing system to cause the die (115) to function differently or include additional functionality based on how any of the unassigned electrical traces (125) are electrically coupled to the die (115) through the wirebonds (130). By first manufacturing a blank cassette (105), the unassigned electrical traces (125) remain unassigned to allow for various assignable functionality to be realized in the blank cassette (105) based on product specifications as dictated by a user-desired functionality in the fluid ejection device (100). Thus, the manufacturer of the fluid ejection device (100) may first construct the blank cassette (105) in anticipation of adding the wirebonds (130) to, at least, the unassigned electrical traces (125) to meet any number of described specifications later. This allows for greater flexibility in manufacture of the fluid ejection device (100) and allows for mass production of the blank cassettes (105) and later personalization of the function of each of the blank cassettes (105). Additionally, the die (115) may be more versatile in functionality due to the ability to develop ad-hoc functionalities through the placement of wirebonds (130) between die pads of the die (115) and the unassigned electrical traces (125), placement of wirebonds (130) between unassigned electrical traces (125) themselves, or combinations thereof.

Assigning the unassigned electrical traces (125) allows for the production of a myriad of different fluid ejection devices (100) with different functionalities. Several examples of these different functionalities will now be provided. In a first example, at least two of the unassigned electrical traces (125) may be coupled together using a wirebond (130). By coupling the two unassigned electrical traces (125) together, the assay fluid dispensing system, when the fluid ejection device (100) is coupled thereto, may send a signal across the at least two unassigned electrical traces (125). This forms a connect detect that allows the fluid ejection device (100) to detect the signal sent and determine that, for example, the interface between the fluid ejection device (100) and the assay fluid dispensing system is complete, the fluid ejection device (100) is properly aligned relative to the interface of the assay fluid dispensing system, or combinations thereof.

The different functionalities may also be dependent on the characteristics of the die (115) itself. The die (115) may be a MEMS device that includes a number of mechanical devices that provide this additional functionality. In any example described herein, the die (115) may include more or less of these mechanical devices to support these additional functions. Some examples of these devices may include sensors, mixers, pumps, filters, heaters, coolers, chemical analyzers, electromagnetic irradiation devices, piezoelectric devices, and thermoresistive devices, among others. The sensors may include temperature sensors, viscosity sensors, particle sensors, particle size sensors, fluid composition sensors, impedance sensors, pH level sensors, and fluid volume sensors, among others. Each of these devices and sensors may be physically coupled to or integrated into the die (115). Additionally, or alternatively, each of the devices and sensors may be in electrical communication with any of a number of die pads formed on an exterior surface of the die (115). As described herein, as the wirebonds (130) electrically couple the unassigned electrical traces (125) to the die pads, the functionalities of the devices and/or sensors are realized.

In any example described herein, at least one unassigned electrical trace (125) may be wirebonded to a die pad such that the wirebonded (130) connection allows an assay fluid dispensing system to detect the devices and sensors, and their associated functionalities within the die (115). Consequently, in any example described herein, any number of types of dies (115) with varying functionalities may be coupled to the substrate (110) of the blank cassette (105) while still allowing the assay fluid dispensing system to take advantage of the myriad of different functionalities of these sensors and devices. This also eliminates the process of manually updating the assay fluid dispensing system regarding the type of die (115) included in the blank cassette (105). In this example, the assay fluid dispensing system may detect the functionality of the die (115) in this manner, and utilize a look-up table stored in a memory device associated with the assay fluid dispensing system to determine the type and functionality of the die (115).

Further, in any example described herein, the die (115) included in the blank cassette (105) may be identical in each blank cassette (105) and may include identical sensors and devices. In these examples, the wirebonding of the wirebonds (130) between the unassigned electrical traces (125) and the die pads define the functionality of the die (115) within each of the individual blank cassettes (105).

In any example described herein, a number of dispense heads that include at least the die (115), assigned electrical traces (120), unassigned electrical traces (125), and wirebonds (130) may be placed within a frame. In this example, the frame may include any number of dispense heads each with their own dies (115), assigned electrical traces (120), unassigned electrical traces (125), and wirebonds (130). During operation of the assay fluid dispensing system, a frame including these dispense heads may be interfaced with a number of connectors of the assay fluid dispensing system. Because the functional properties of each of the dies (115) may be varied, the frame may include any number of different types of dies (115) with any number of different functions assigned based on the placement of their respective wirebonds (130). Thus, during operation of the assay fluid dispensing system; a first fluid may be ejected from a first die (115), a second fluid may be filtered and ejected from a second die (115), a third fluid may be titrated and ejected from a third die (115), a number of empirical properties of a fourth fluid may be sensed and then ejected by a fourth die (115), among other examples of fluid sensing, manipulation, and ejection. Although the above is meant merely as an example, the present specification contemplates the use of any dispense head to be coupled within a group of dispense heads into a frame and used for any functional purpose as described herein.

Figure 2:
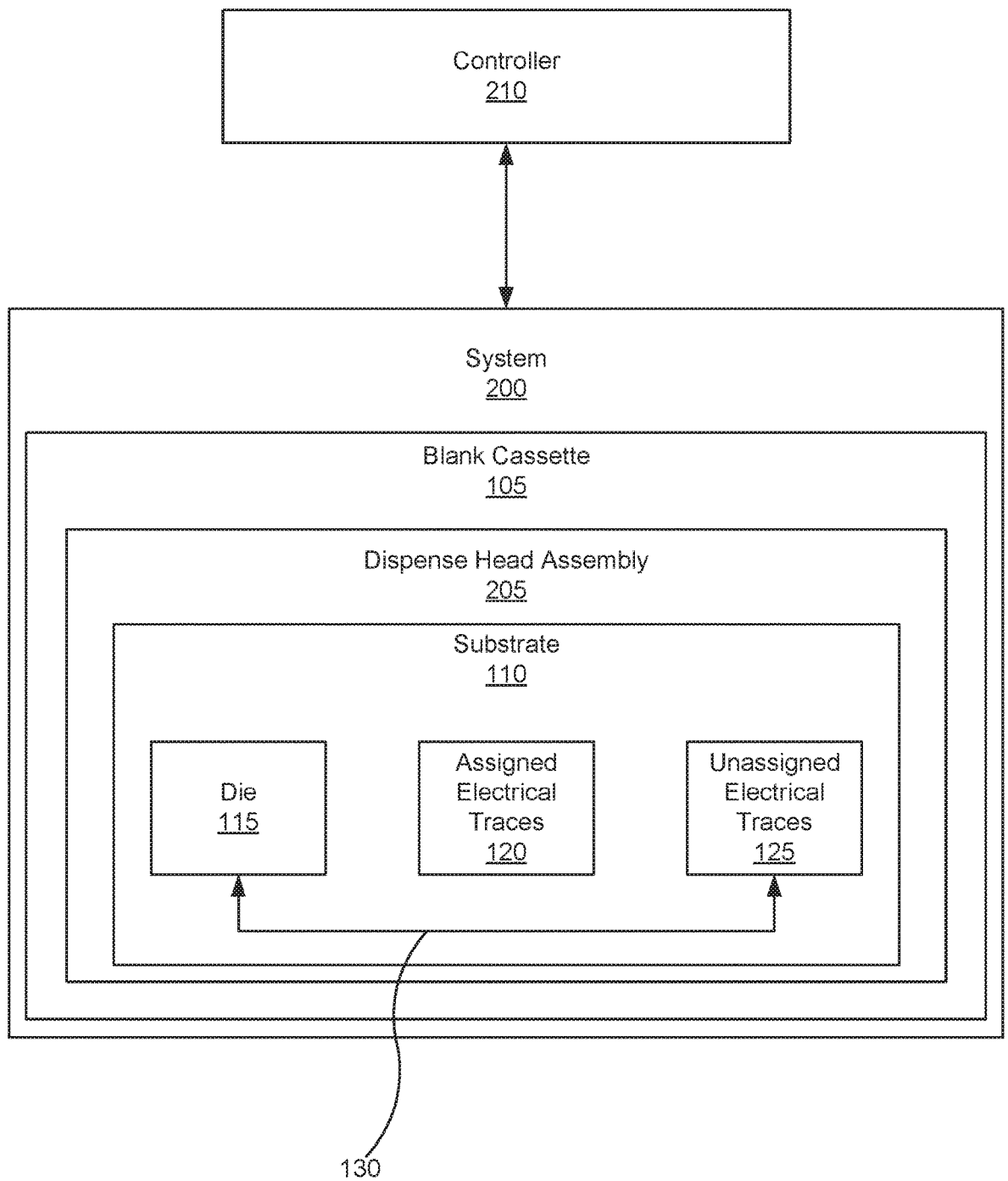
FIG. 2 is a block diagram of a system for ejecting a fluid into an assay according to an example according to an example of the principles described herein.

FIG. 2 is a block diagram of a system (200) for ejecting a fluid into an assay according to an example according to an example of the principles described herein. The system (200) may include at least one dispense head (205). The at least one dispense head (205) may include a blank cassette (105) that includes a substrate (110), a die (115) coupled to the substrate (110), a number of assigned electrical traces (120), and a number of unassigned electrical traces (125). The system (200) may further include at least one wirebond (130) coupling at least one of the unassigned electrical traces (125) to the die (115) assigning at least one function to the dispense head (205). The system (200) may further include a controller (210) communicatively coupled to the die (115) to instruct the die (115) to eject an amount of the fluid.

The system (200) may include similar elements as those described above in connection with FIG. 1 and similar reference numbers may be used to denote similar elements. The system (200) includes the blank cassette (105) and wirebonds (130) as described in FIG. 1, Additionally, the system (200) a controller (210) communicatively coupled to the die (115) to instruct the die (115) to, at least, eject an amount of the fluid. The controller (210) may be electrically coupled to the die (115) through an interface of an assay fluid dispensing system, a number of contact pads defined on the substrate (110), and number of assigned electrical traces (120) defined on the substrate (110), a number of unassigned electrical traces (125) defined on the substrate (110), and the wirebonds (130) as described above.

The controller (210) may include the hardware architecture to retrieve executable code from a data storage device and execute the executable code. The executable code may, when executed by the controller (210), cause the controller (210) to implement at least the functionality of sending any number of electrical signals to the die (115), according to the methods of the present specification described herein. In the course of executing code, the controller (210) may receive input from and provide output to a number of hardware units as described herein.

The system (200) may be utilized in any data processing scenario including, stand-alone hardware, mobile applications, through a computing network, or combinations thereof. Further, the system (200) may be used in a computing network, a public cloud network, a private cloud network, a hybrid cloud network, other forms of networks, or combinations thereof. In one example, the methods provided by the system (200) are provided as a service over a network by, for example, a third party. The present system (200) may be implemented on one or multiple hardware platforms, in which the modules in the system (200) can be executed on one or across multiple platforms. Such modules can run on various forms of cloud technologies and hybrid cloud technologies or offered as a SaaS (Software as a service) that can be implemented on or off the cloud. In another example, the methods provided by the system (200) are executed by a local administrator.

To achieve its desired functionality, the system (200) comprises various hardware components. Among these hardware components may be a number of controllers (210), a number of data storage devices, a number of peripheral device adapters, and a number of network adapters. These hardware components may be interconnected through the use of a number of busses and/or network connections. In one example, the controller (210), data storage device, peripheral device adapters, and a network adapter may be communicatively coupled via a bus.

The data storage device may store data such as executable program code that is executed by the controller (210) or other processing device. As will be discussed, the data storage device may specifically store computer code representing a number of applications that the controller (210) executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage. For example, in certain examples the controller (210) may boot from Read Only Memory (ROM), maintain nonvolatile storage in the Hard Disk Drive (HDD) memory, and execute program code stored in Random Access Memory (RAM).

Generally, the data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the system (200) enable the controller (210) to interface with various other hardware elements, external and internal to the system (200). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the system (200) to interact with and implement the functionality of the system (200). The peripheral device adapters may also create an interface between the controller (210) and the display device, a printer, or other media output devices. The network adapter may provide an interface to other computing devices within, for example, a network, thereby enabling the transmission of data between the system (200) and other devices located within the network.

The display may, when executed by the controller (210), display the number of graphical user interfaces (GUIs) on the display device associated with the executable program code representing the number of applications stored on the data storage device. Examples of display devices include a computer screen, a laptop screen, a mobile device screen, a personal digital assistant (PDA) screen, and a tablet screen, among other display devices.

Figure 3:
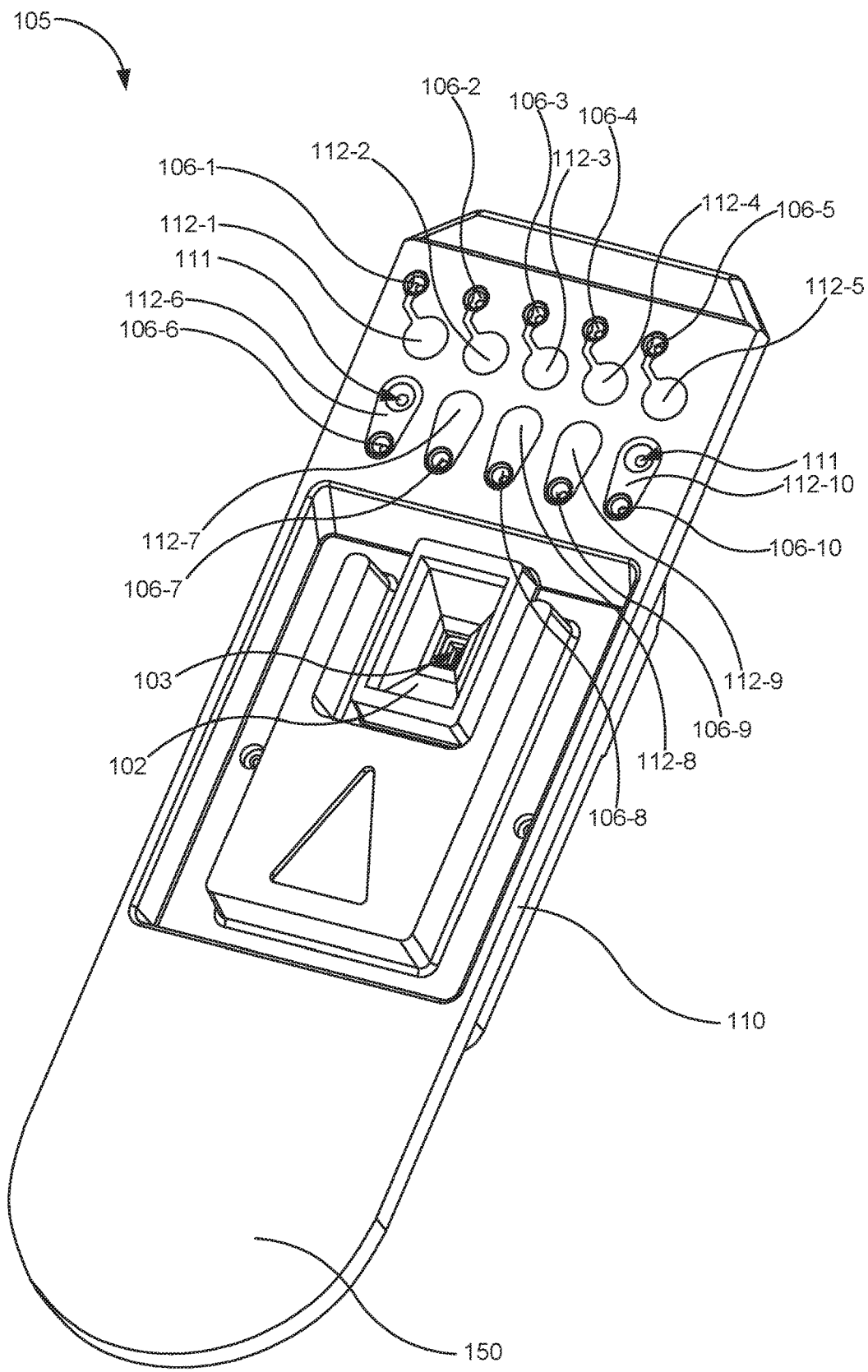
FIG. 3 is a front, perspective view of a first blank cassette according to an example of the principles described herein.
Figure 4:
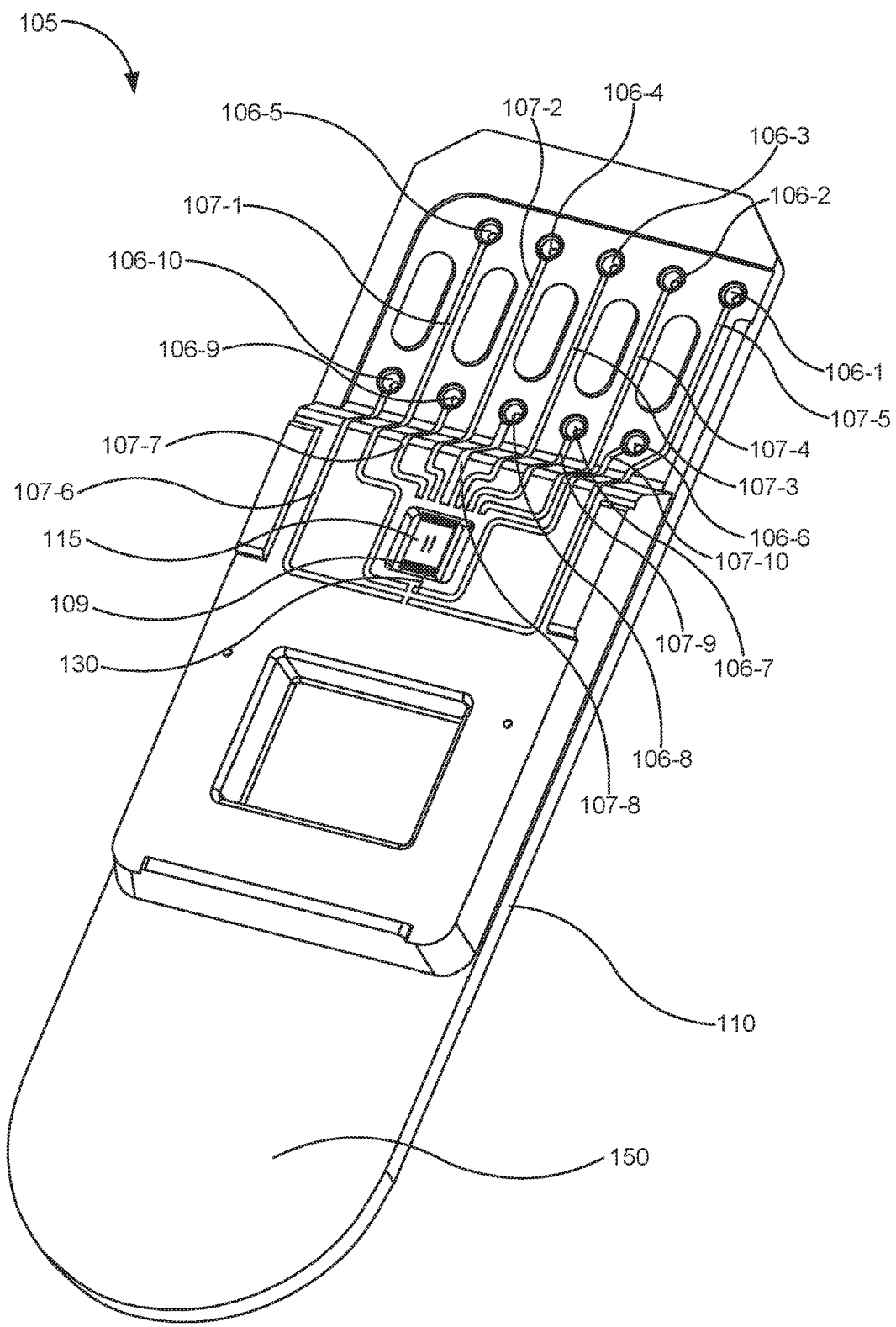
FIG. 4 is a back, perspective view of the first volume cassette of FIG. 3 according to an example of the principles described herein.

FIG. 3 is a front, perspective view of a first blank cassette (105), according to one example of the principles described herein. Further, FIG. 4 is a back, perspective view of the first blank cassette (105) of FIG. 3 according to an example of the principles described herein. The first blank cassette (105) includes a reservoir (102) defined in the substrate (110) having a first volume. Further a fluid aperture (103) may couple the reservoir (102) to a proximal side of the die (115) allowing an amount of fluid to pass through the die (115) and be ejected by, for example, a piezoelectric device or thermoresistive device in the die (115).

The fluid aperture (103) allows for an assay fluid to move from one side of the substrate (110) to another. The substrate (110) may include a handle (150) to allow a user to touch, pick up, and move the blank cassette (105) without contaminating the reservoir (102) or an assay fluid deposited therein.

The die (115) may be coupled to the substrate (110) on an opposite side of the reservoir (102) and in line with the fluid aperture (103). In an example, the die (115) may be, for example, a microelectromechanical system (MEMs) device. In another example, the die (115) may be a fluid ejection device.

The reservoir (102) is fluidically coupled to the die (115) by the fluid aperture (103) so that the assay fluid may be introduced to the die (115) to allow the die (115) to eject the assay fluid into a number of the wells of a well plate as instructed by an assay fluid dispensing system (200).

A number of electrical components are included on the front and back surfaces of the substrate (110). The electrical components may be made of any electrically conductive material to allow for electrical signals to be sent between the assay fluid dispensing system (200) and the die (115). For example, a number of contact pads (112-1, 112-2, 112-3, 112-4, 112-5, 112-6, 112-7, 112-8, 112-9, 112-10, collectively referred to herein as 112) may be included on the front surface of the substrate (110). The contact pads (112) provide for an electrically conducive interface between the assay fluid dispensing system (200) and the blank cassette (105).

A number of vias (106-1, 106-2, 106-3, 106-4, 106-5, 106-6, 106-7, 106-8, 106-9, 106-10, collectively referred to herein as 106) may be formed in the substrate (110) and electrically coupled to the contact pads (112). The vias (106) may be any electrical connection that goes through the substrate (110) and couples the contact pads (112) to a number of electrical components on the opposite side of the substrate (110).

A depicted in FIG. 4, the vias (106) are coupled on the opposite side of the substrate (110) to a number of traces (107-1, 107-2, 107-3, 107-4, 107-5, 107-6, 107-7, 107-8, 107-9, 107-10, collectively referred to herein as 107). The traces (107) may be coupled to the die (115) using a number of wirebonds (130) coupled between a number of die pads (109) of the die (115). Although one wirebond (130) coupled between a trace (107) and a die pad (109) is depicted in FIG. 4, any number of wirebonds (130) may be used to electrically couple the die (115) to an assay fluid dispensing system (200) to allow control signals for controlling the die (115) to run from the assay fluid dispensing system (200), through the contact pads (112), the vias (106), the traces (107), and the wirebonds (130), to the die pads (109) of the die (115).

Figure 5:
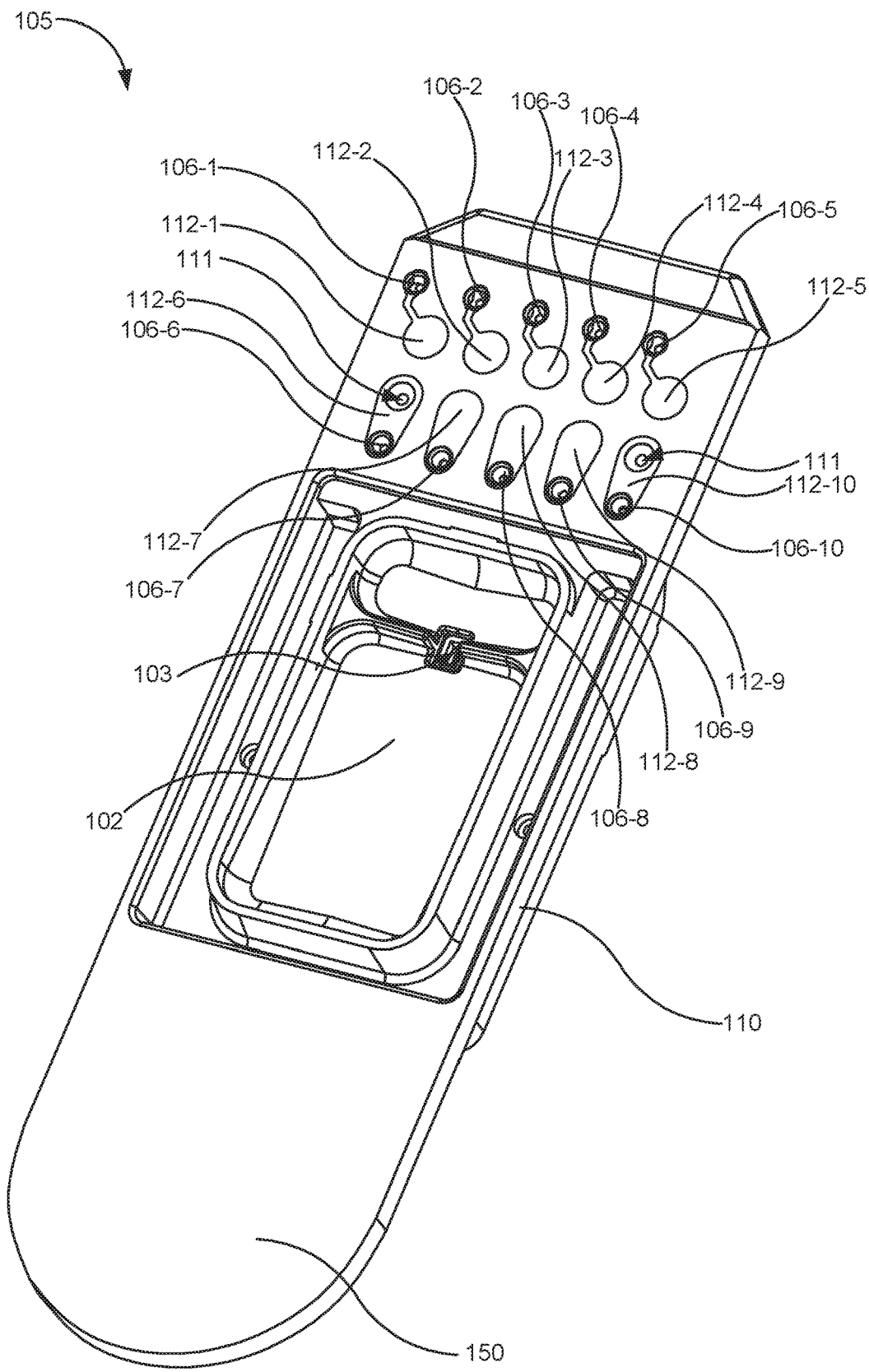
FIG. 5 is a front, perspective view of a second volume cassette according to an example of the principles described herein.
Figure 6:
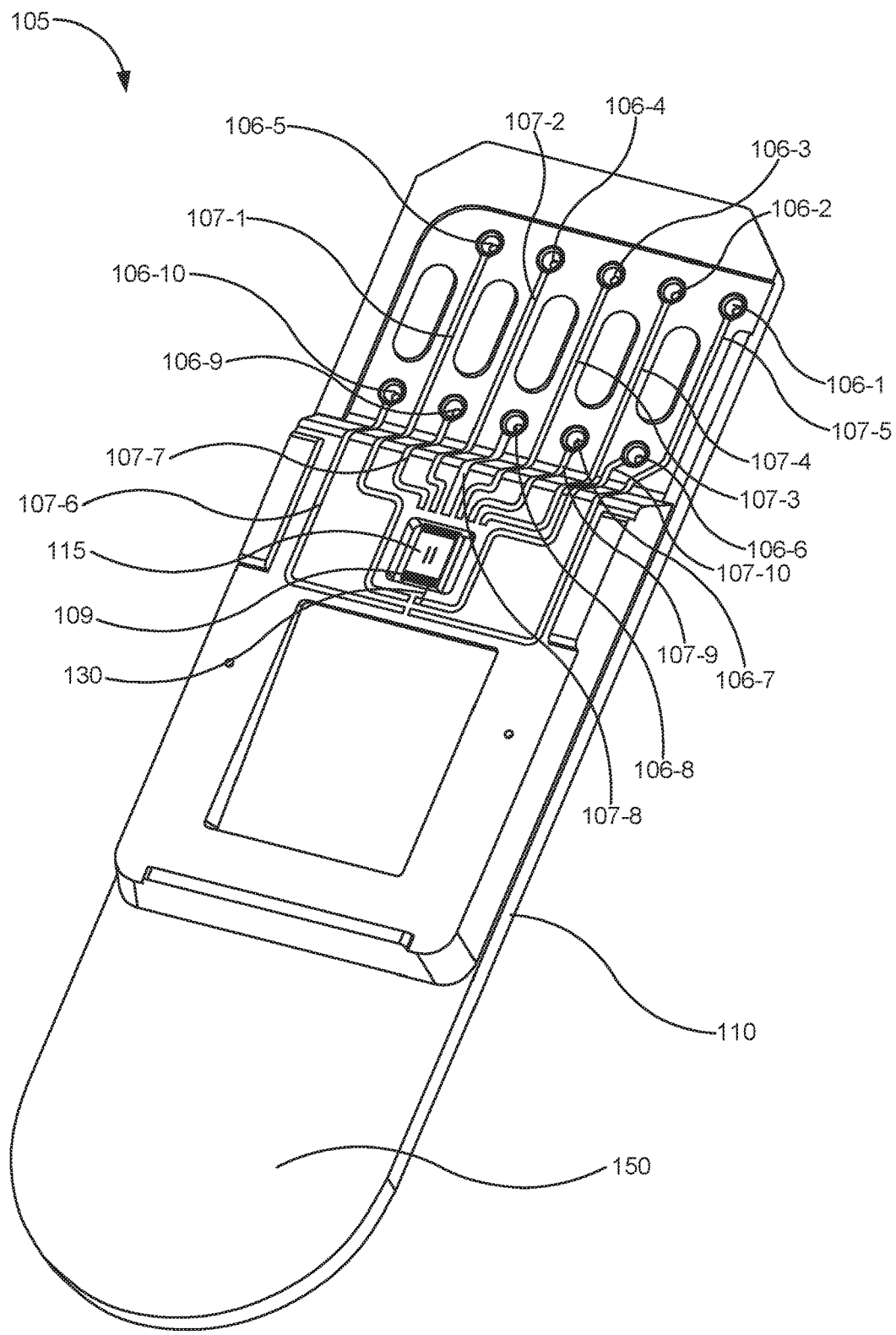
FIG. 6 is a back, perspective view of the second volume cassette of FIG. 5 according to an example of the principles described herein.

FIG. 5 is a front, perspective view of a second blank cassette (105) according to one example of the principles described herein. Further, FIG. 6 is a back, perspective view of the second blank cassette (105) of FIG. 5 according to one example of the principles described herein. The second blank cassette (105) includes elements identical to the first blank cassette (105) except for the volume of fluid that may be introduced into the reservoir (102). The reservoir (102) in the example of FIGS. 3 and 4, may be relatively smaller than the reservoir (102) in the example of FIGS. 5 and 6. In one example, the reservoir (102) of FIGS. 3 and 4 may be sized to contain approximately 20 microliters of fluid, while the reservoir (102) of FIGS. 5 and 6 may be sized to contain a fluid volume greater than 20 microliters.

Figure 7:
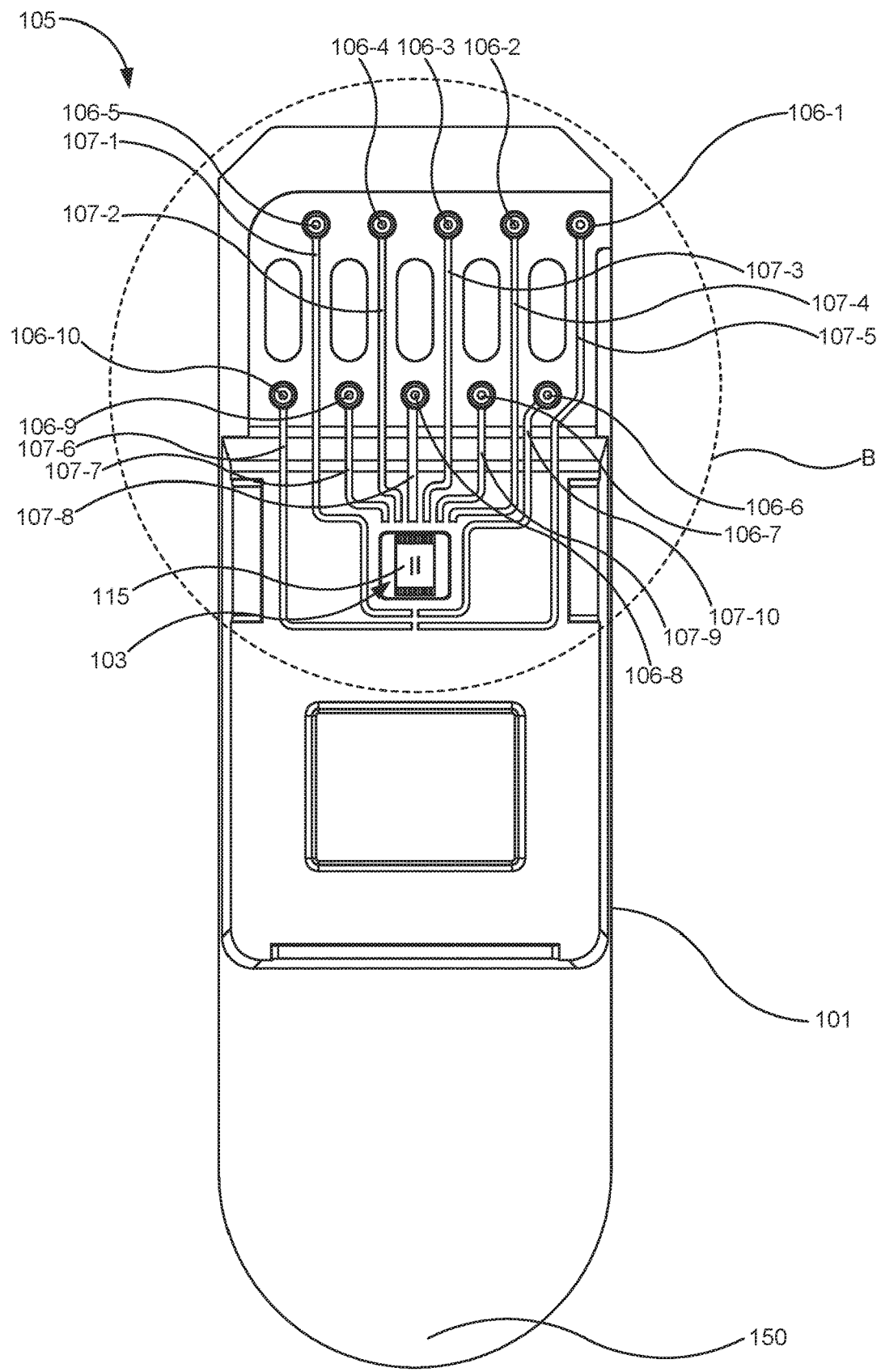
FIG. 7 is a back, plan view of the blank cassette of FIG. 1 according to an example of the principles described herein.
Figure 8:
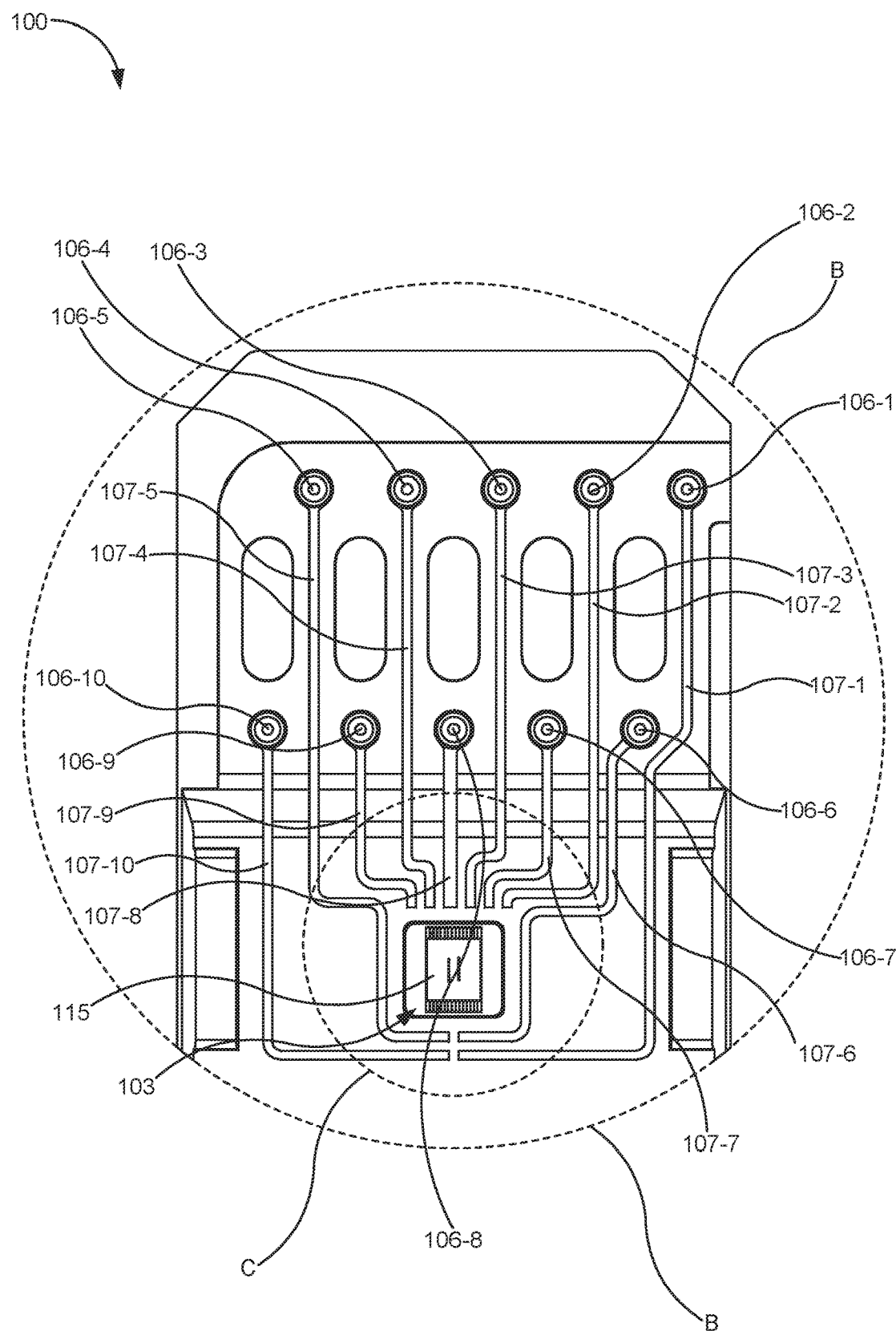
FIG. 8 is a back, plan view of the blank cassette of FIG. 1 as viewed in circle B of FIG. 7 according to an example of the principles described herein.
Figure 9:
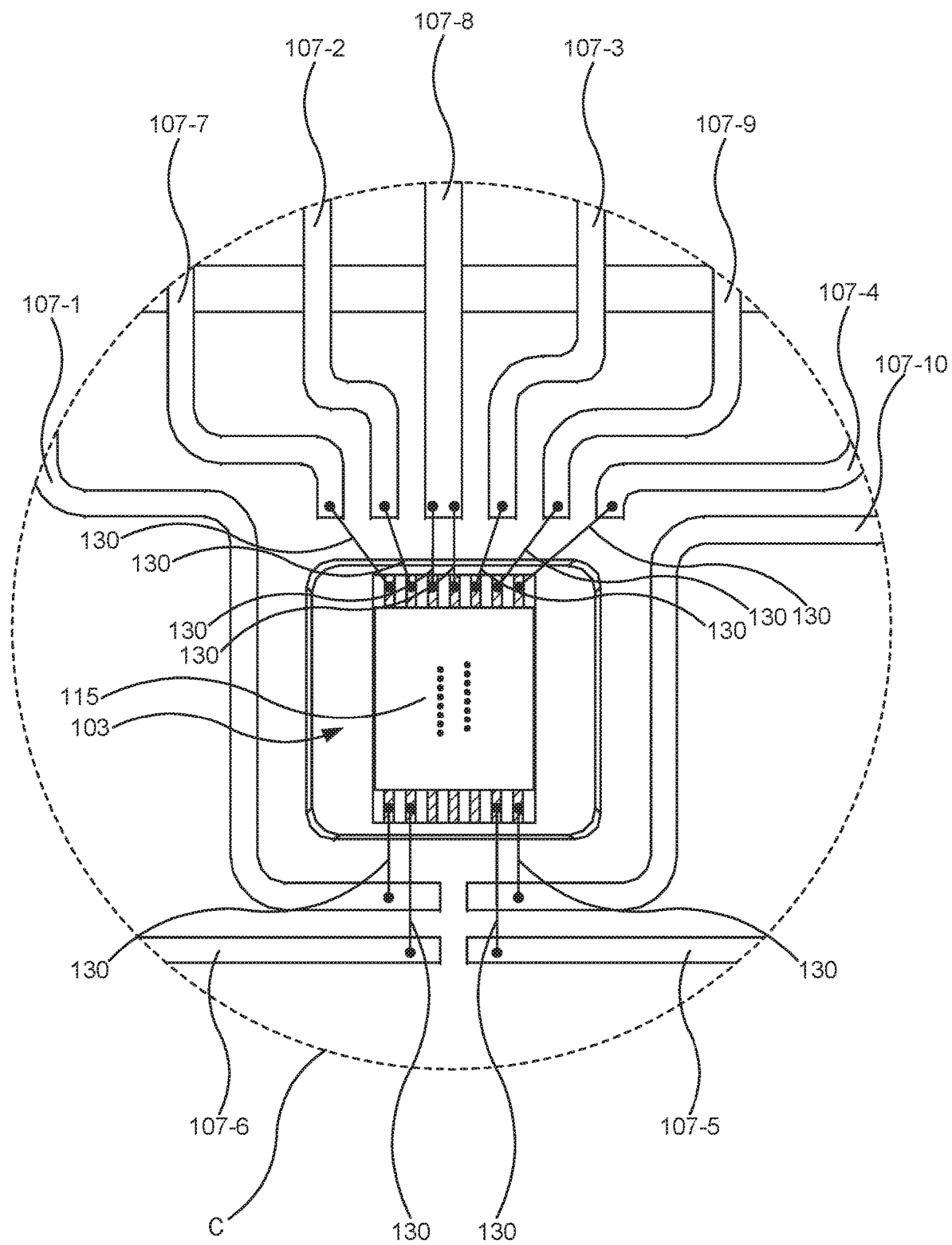
FIG. 9 is a back, plan view of the blank cassette of FIG. 1 as viewed in circle C of FIG. 8 according to an example of the principles described herein.

FIG. 7 is a back, plan view of the blank cassette (105) of FIG. 1 according to one example of the principles described herein. Further, FIG. 8 is a back, plan view of the blank cassette (105) of FIG. 1 as viewed in circle B of FIG. 7 according to one example of the principles described herein. Even further, FIG. 9 is a back, plan view of the blank cassette (105) of FIG. 1 as viewed in circle C of FIG. 8 according to one example of the principles described herein. Even though the first blank cassette (105) is used in describing the offset layout of the vias (106), the second blank cassette (105) and its electrical component layout may be described in an identical manner. For convenience in understanding the wirebonds (130), some reference numbers have been omitted.

Figure 10:
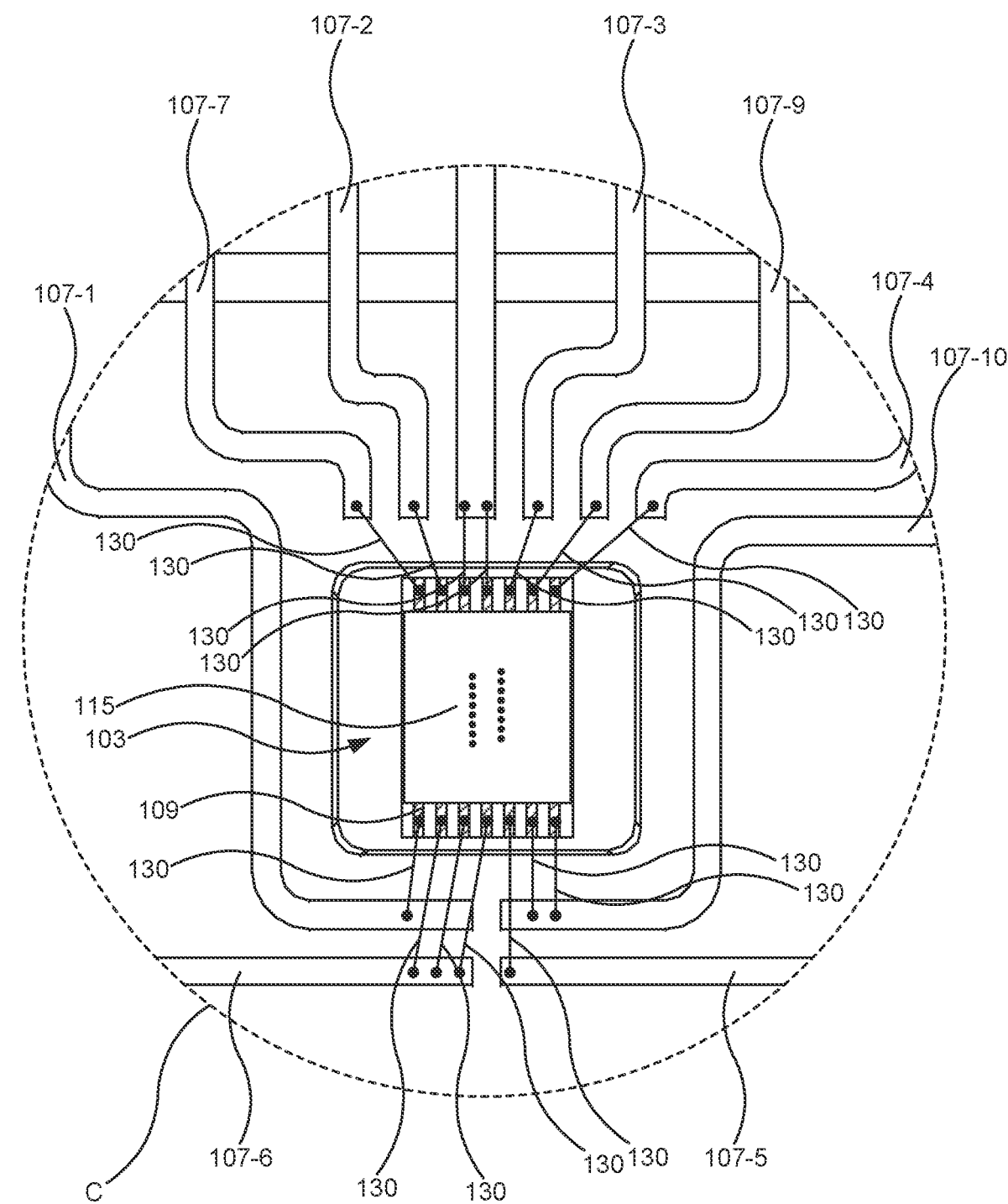
FIG. 10 is a back, plan view of the blank cassette of FIG. 1 as viewed in circle C of FIG. 8 according to an example of the principles described herein.
Figure 11:
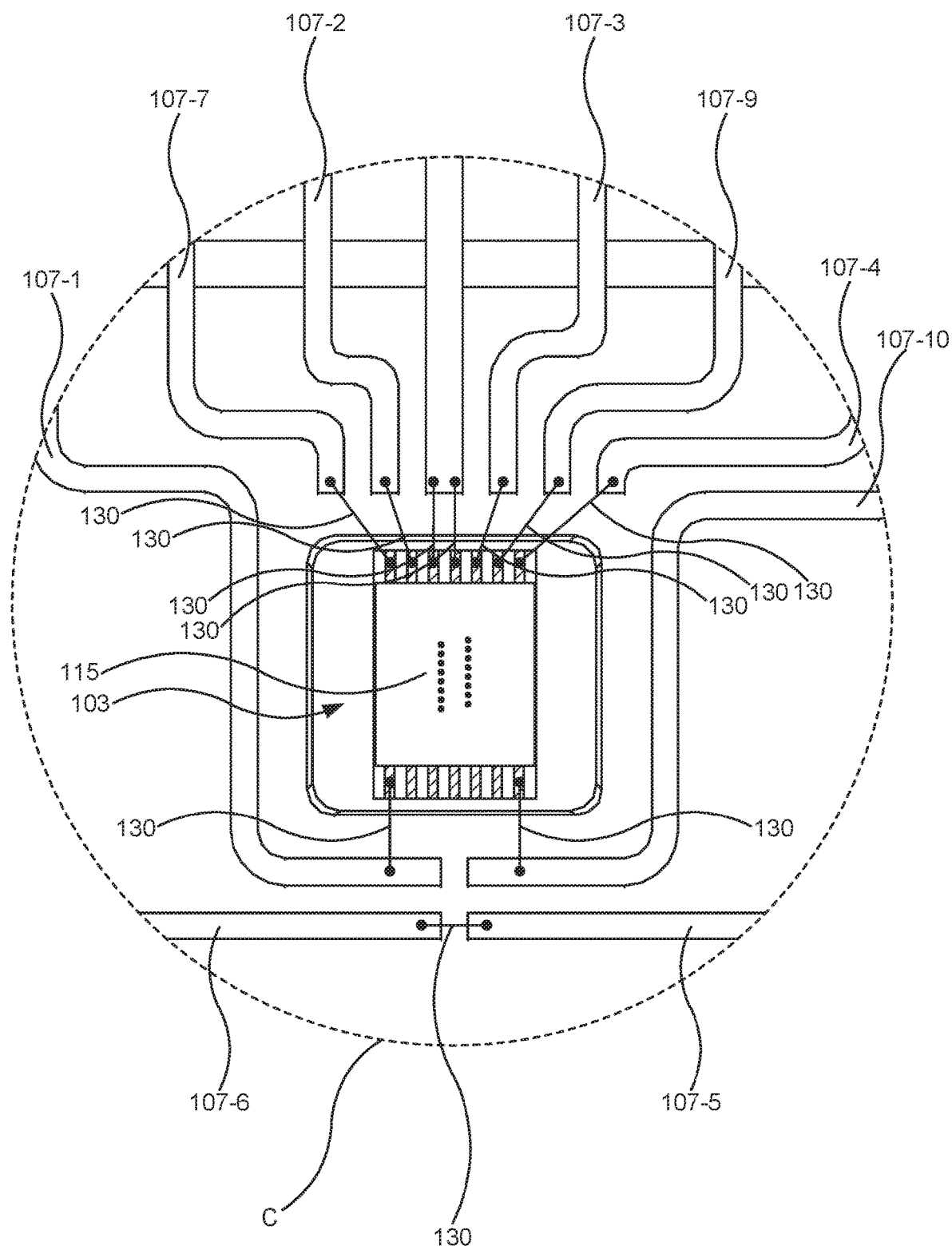
FIG. 11 is a back, plan view of the blank cassette of FIG. 1 as viewed in circle C of FIG. 8 according to an example of the principles described herein.

FIGS. 7 and 8 are provided to show detail with regard to the vias (106) and trace (107) of the blank cassette (105) and their layout thereon. FIGS. 9-11 are provided to show specific detail with regards to the wirebonds (130) relative to their position in coupling the traces (107) to the die pads (109) of the die (115). Thus, elements depicted in FIGS. 7 and 8 are described herein. The wirebonds (130) depicted in FIGS. 9-11 couple the assigned electrical traces (107-2, 107-3, 107-4, 107-7, 107-8, 107-9) to their respective die pads (109). Again, during manufacture of the blank cassette (105) of the fluid ejection device (100), the assigned electrical traces (107-2, 107-3, 107-4, 107-7, 107-8, 107-9) may not be electrically coupled to the die (115) using a number of wirebonds (130). Instead, the assigned electrical traces (107-2, 107-3, 107-4, 107-7, 107-8, 107-9) may be assigned according to the above contact pad assignment as dictated by the assay fluid dispensing system. However, after the blank cassette (105) has been formed, the completion of the assignment of the assigned electrical traces (107-2, 107-3, 107-4, 107-7, 107-8, 107-9) may be made by connecting the assigned electrical traces (107-2, 107-3, 107-4, 107-7, 107-8, 107-9) to particular die pads defined on the die (115). The connection is made using a wirebond (130) for each of the assigned electrical traces (107-2, 107-3, 107-4, 107-7, 107-8, 107-9). In the examples of FIGS. 9-11, the wirebonds (130) coupling the assigned electrical traces (107-2, 107-3, 107-4, 107-7, 107-8, 107-9) to the die (115) are contemplated and common among all blank cassettes (105) being manufactured. Thus, their connection to specific die pads (109) of the die (115) provide the basic functionality of the die (115) such as fluid ejection, data transfer, powering of the die, providing firing signals, providing a clock signal, providing a ground, interaction with a TSR, and other functions common among all manufactured blank cassettes (105). Even though these functions are identified in the present specification as being common among all blank cassettes (105), fewer or more functionality may be considered to be common among the manufactured blank cassettes (105).

The unassigned electrical traces (107-1, 107-5, 107-6, 107-10) are those traces that remain unassigned after the formation of the blank cassette (105). FIGS. 9-11 include four unassigned electrical traces (107-1, 107-5, 107-6, 107-10), fewer or more of the electrical traces (107) may be indicated as unassigned and may be coupled to the die (115) using wirebonds (130) in order to provide further functionality to the die (115). The unassigned electrical traces (107-1, 107-5, 107-6, 107-10) are unassigned because if wirebonded to the die (115), additional functionality may be realized in the blank cassette (105). Specifically, if the unassigned electrical traces (107-1, 107-5, 107-6, 107-10) are never electrically connected to the die (115), the assay fluid dispensing system may detect this and provide no signals to the unassigned electrical traces (107-1, 107-5, 107-6, 107-10) and their respective contact pads defined on the substrate (110). FIGS. 9-11 show specific examples of wirebond (130) layouts with respect to the unassigned electrical traces (107-1, 107-5, 107-6, 107-10). However, any specific layout may be realized through the versatility of the wirebonding patterns in association with the unassigned electrical traces (107) and the present specification contemplates these other wirebonding patterns.

FIG. 9 shows a number of wirebonds (130) coupled to a number of unassigned electrical traces (107-1, 107-5, 107-6, 107-10). In the example of FIG. 9 a single wirebond (130) connects a single unassigned electrical trace (107-1, 107-5, 107-6, 107-10) to a respective die pad (109) on the die (115) In this example, the additional functionality imposed on the die (115) resulting from the addition of the wirebonds (130) may be determined by those MEMS devices within the die (115). As described herein, the system (200) may detect those connections created by the wirebonds (130) by sending a sensing signal through the unassigned electrical traces (107-1, 107-5, 107-6, 107-10) and identifying those MEMS devices within the die (115) associated with the die pads (109) to which the wirebonds (130) are coupled. Additionally, or alternatively, the system (200) may detect the type of die (115) being used and implement a look-up table to determine the added functionality resulting from the placement of the wirebonds (130).

FIG. 10 is similar to that of FIG. 9 by showing a number of wirebonds (130) coupled to a number of unassigned electrical traces (107-1, 107-5, 107-6, 107-10). However, in this example several wirebonds (130) are coupled between a common unassigned electrical trace (107-1, 107-5, 107-6, 107-10) and a plurality of die pads (109). In these examples, a signal may be passed across an unassigned electrical trace (e.g., 107-10) and through a plurality of wirebonds (130) and into a respective plurality of die pads (109) on the die (115). This signal may be used, therefore, to activate or otherwise implement a plurality of MEMS devices built into the die (115) using a common signal. For example, a plurality of fluid pumps may be simultaneously activated using this single signal from the system (200).

In the examples shown in FIG. 10 certain wirebonds (130) pass over an unassigned electrical trace (e.g., 107-1 and 107-10) in order to be coupled to another unassigned electrical trace (e.g., 107-5, 107-6). In this example, the wirebond (130) may be insulated from the first unassigned electrical trace (e.g., 107-1 and 107-10) and electrically coupled to the second unassigned electrical trace (e.g., 107-5 and 107-6). In FIGS. 9-11, the dots at the ends of the wirebonds (130) indicate the terminus of the wirebonds (130).

FIG. 11 is similar to that of FIGS. 9 and 10 by showing a number of wirebonds (130) coupled to a number of unassigned electrical traces (107-1, 107-5, 107-6, 107-10). However, in this example, a wirebond (130) may be used to couple a plurality of unassigned electrical traces (107-1, 107-5, 107-6, 107-10) to one another as described herein. This allows for the system (200) to execute a connect detect operation in order to discover proper connection of the blank cassette (105) to the interface of the system (200).

Figure 12:
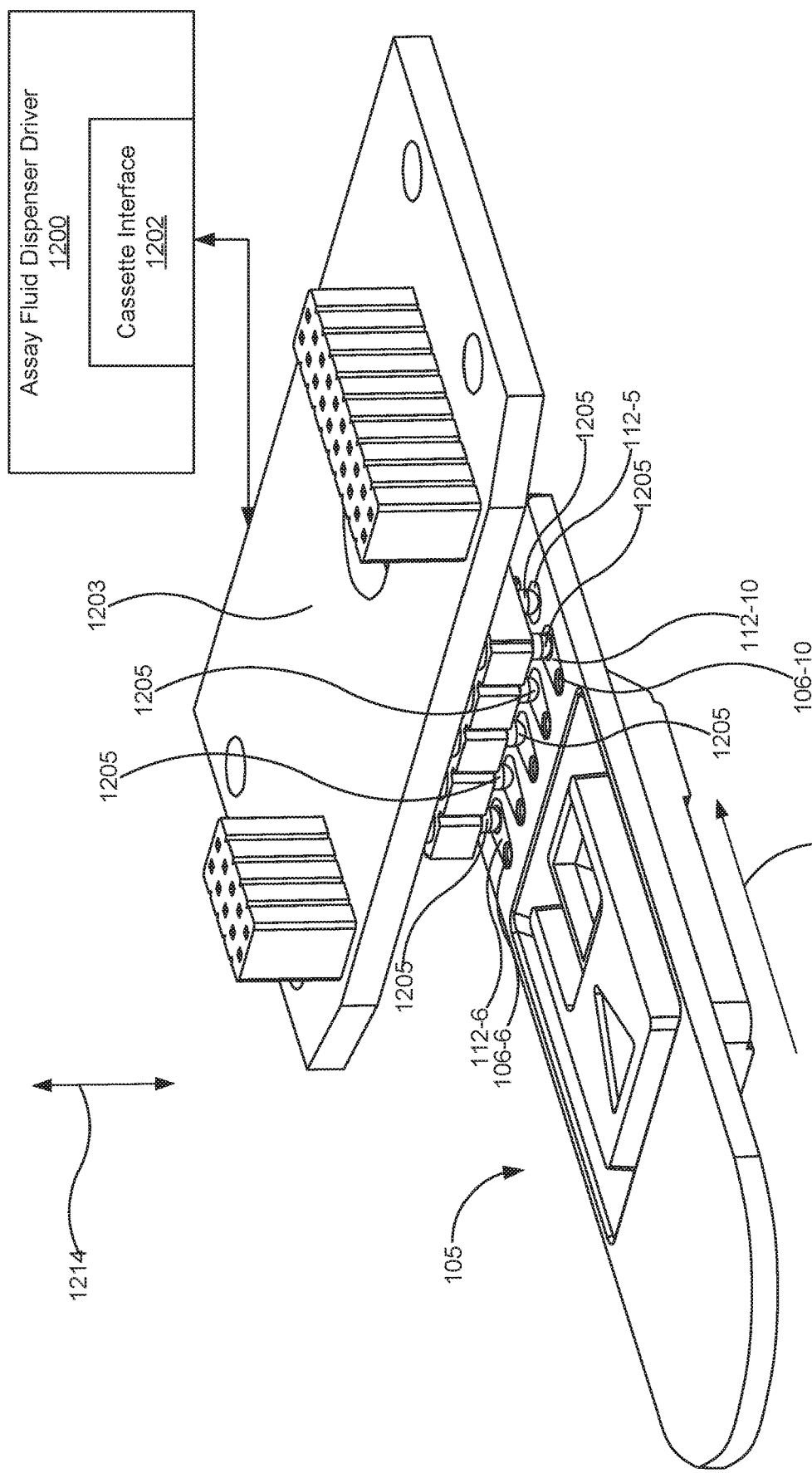
FIG. 12 is a perspective view of the blank cassette (105) of FIG. 1 interfaced with a printed circuit assembly (PCA) of a cassette interface of an assay fluid dispenser driver according to one example of the principles described herein.

FIG. 12 is a perspective view of the blank cassette (105) of FIG. 1 interfaced with a printed circuit assembly (1203) (PCA) of a cassette interface of an assay fluid dispenser driver (1200) according to one example of the principles described herein. The assay fluid dispenser driver (1200) may serve, in an example, as the system (200) described herein. As depicted, the assay fluid dispenser driver (1200) includes a cassette interface (1202) and a PCA (1203). Although the first blank cassette (105) of FIGS. 3 and 4 is depicted in FIG. 12, the blank cassette (105) of FIGS. 5 and 6 may also function and be utilized in a similar manner.

In one example, the blank cassette (105) may interface with the PCA (1203), a cassette interface (1202), and the assay fluid dispenser driver (1200) by inserting the blank cassette (105) along a number of alignment surfaces or registers of the assay fluid dispenser driver (1200) in the direction of arrow (1204). In another example, the PCA (1203) and/or the blank cassette (105) may move in the directions indicated by arrow (1214) to interface the blank cassette (105) with the PCA (1203). In this example, the blank cassette (105) may be placed in a station of the assay fluid dispenser driver (1200), and the assay fluid dispenser driver (1200) moves the PCA (1203) onto the blank cassette (105) in the direction of arrow (1214) until contact between the PCA (1203) and the contact pads (112) of the blank cassette (105) is achieved. In still another example, a combination of inserting a blank cassette (105) along a number of alignment surfaces of the assay fluid dispenser driver (1200) in the direction of arrow (1204) and the movement PCA (1203) and/or blank cassette (105) in the directions indicated by arrow (1214) may be used to interface the blank cassette (105) with the PCA (1203). In one example, the PCA (1203) is coupled to the blank cassette (105) via a number of pogo connectors (1205) at the contact pads (112).

Figure 13:
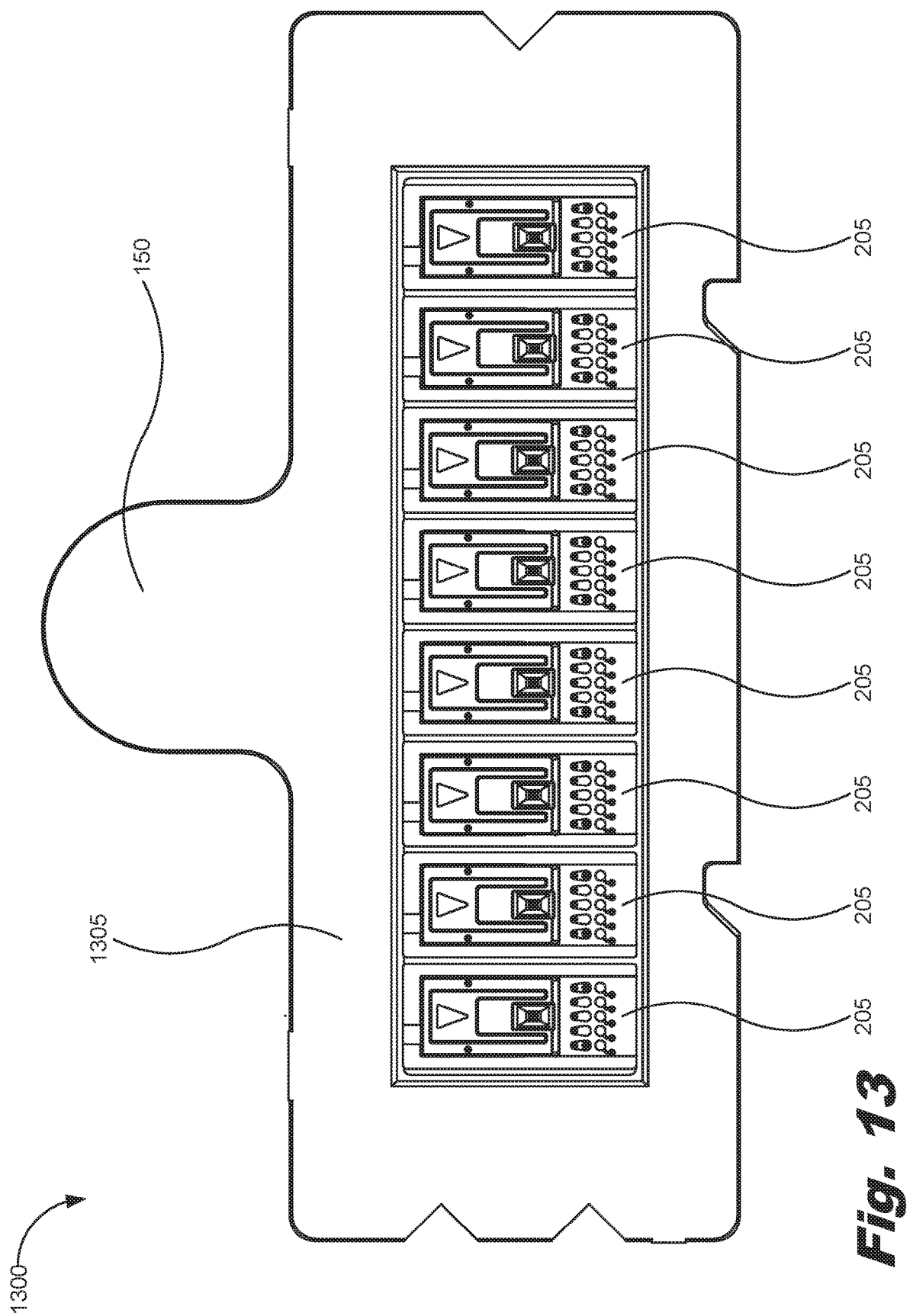
FIG. 13 is a front plan view of a blank cassette including a plurality of dispense heads according to one example of the principles described herein.

FIG. 13 is a front plan view of a blank cassette (105) including a plurality of dispense heads (205) according to an example of the principles described herein. Each of the dispense heads (205) may include the substrate (110), reservoir (102), fluid aperture (103), die (115), contact pads (112), vias (106), traces (107), wirebonds (130), die pads (109), and other elements as described above. In the example shown in FIG. 13, the dispense heads (205) are mounted onto a frame (1305). In an example, the dispense heads (205) may be mechanically coupled to the frame (1305) by, for example, a welding processes, a chemical bonding process, or by a number of fasteners. In an example, the frame (1305) forms the substrate (110) of each dispense heads (205) such that each of the dispense heads (205) are formed into a single monolithic frame (1305).

Figure 14:
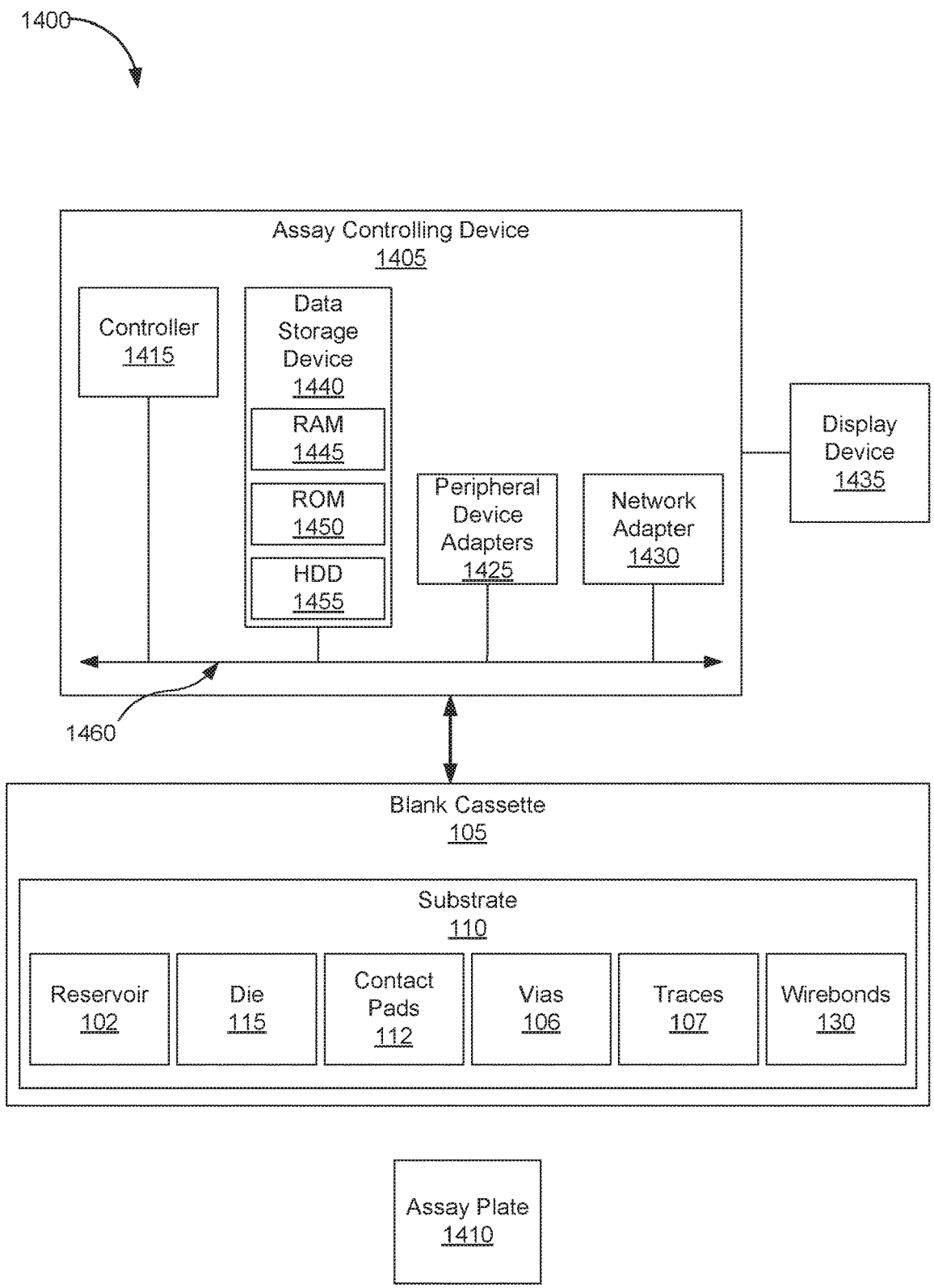
FIG. 14 is a block diagram of a system for ejecting a fluid into an assay according to one example of the principles described herein.

FIG. 14 is a block diagram of a system (1400) for ejecting a fluid into an assay (1410) according to one example of the principles described herein. The system (1400) includes an assay controlling device (1405), a blank cassette (105) as described above, and an assay plate (1410). Although the first blank cassette (105) of FIG. 3 is depicted in FIG. 14, either the second blank cassette (105) or combinations of the first and second blank cassette (105) with a frame (1305) may be included in the system (1400).

The blank cassette (105) may include, at least, the substrate (110), reservoir (102), fluid aperture (103), die (115), contact pads (112), vias (106), traces (107), wirebonds (130), die pads (109), and other elements as described above. Although the blank cassette (105) shown in FIG. 14 does or does not include certain elements as described herein, each of the elements associated with the blank cassette (105) may or may not be included. In order to achieve these different examples, the physical properties of the blank cassette (105) may be changed. For example, where the blank cassette (105) does not comprise the vias (106) as described above, the traces (107) and contact pads (112) may be included on a single side of the blank cassette (105) such that the PCA (1203) contacts the blank cassette (105) via the back side of the blank cassette (105) instead of the front.

The assay plate (1410) may be any plate that receives a fluid ejected from the die (115). The assay plate (1410) may include a number of wells into which the fluid may be ejected. The assay plate (1410) may further include a structure to which the assay controlling device (1405) may interact with the assay plate (1410) to move the assay plate (1410) relative to the die (115) of the blank cassette (105). To achieve its desired functionality, assay controlling device (1405) comprises various hardware components. Among these hardware components may be a number of controllers (1415), a number of data storage devices (1440, 1445, 1450, 1455), a number of peripheral device adapters (1425), and a number of network adapters (1430). These hardware components may be interconnected through the use of a number of busses (1460) and/or network connections. In one example, the controllers (1415), data storage devices (1440), peripheral device adapters (1425), and network adapters (1430) may be communicatively coupled via a bus (1460). The display device (1435) may be provided to allow a user of the assay controlling device (1405) to interact with and implement the functionality of the assay controlling device (1405).

Figure 15:
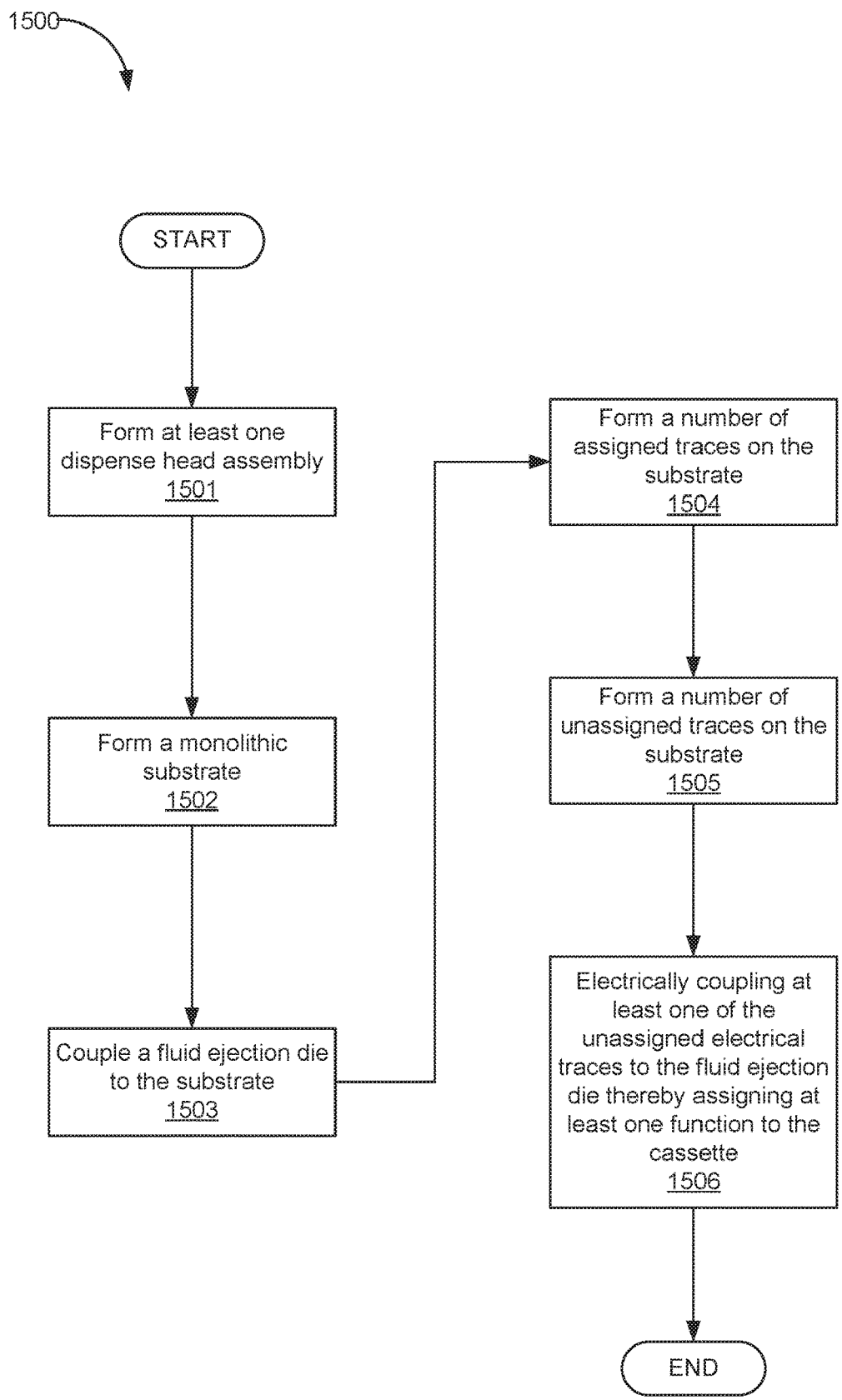
FIG. 15 is a flowchart showing a method of forming a cassette according to an example of the principles described herein.

FIG. 15 is a flowchart showing a method (1500) of forming a cassette according to an example of the principles described herein. The method (1500) may include forming (1505) at least one dispense heads (205) by forming (1510) a monolithic substrate (110), coupling (1515) a fluid ejection die (115) to the substrate (110), forming (1520) a number of assigned traces (120) on the substrate (110), and forming (1525) a number of unassigned traces (125) on the substrate (110). In an example, a plurality of dispense heads (205) may be formed (1505) and placed into a frame (1305) as described herein. In this example, the frame (1305) forms at least part of the cassette (105).

The method (1500) may further include electrically coupling (1530) at least one of the unassigned traces (125) to the fluid ejection die (115) thereby assigning at least one function to the cassette (105). As described herein, the number of wirebonds (130) may be used to electrically couple the unassigned traces (125) to the fluid ejection die (115). The arrangement of the wirebonds (130), therefore, allows for functionally different and varied fluid ejection dies (115) to be produced from a single blank cassette (105). The production of a single blank cassette (105) may reduce manufacturing costs while also increasing the variability of the functionality of the fluid ejection die (115).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, controller (210) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a fluid ejection device used in an assay fluid dispensing system and a method of forming the fluid ejection device. The wirebonds used to couple the unassigned electrical traces provided on a blank cassette of the fluid ejection device allow any single blank cassette to be assigned any number of functions based on any chosen layout of the wirebonds relative to the die pads and unassigned electrical traces. This allows for versatility in the functionality of the fluid ejection dies as well as versatility in the functions any group of dies in a frame may perform.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid ejection device comprising:
  a blank cassette comprising:
    a substrate;
    a die coupled to the substrate;
    a number of assigned electrical traces formed on the substrate, wherein the number of assigned electrical traces are wirebonded to the die;
    a number of unassigned electrical traces formed on the substrate, wherein the number of unassigned electrical traces are not wirebonded to the die after formation of the blank cassette;
  at least one wirebond coupling at least one of the assigned electrical traces to the die assigning at least one function to the fluid ejection device; and
  at least one end user-defined wirebond coupling at least one of the unassigned electrical traces to the die assigning at least one additional function to the fluid ejection device.

2. The fluid ejection device of claim 1,
  wherein a first wirebond of the at least one end user-defined wirebond coupled between a first die pad of the die and a first unassigned trace provides a first function different from the first wirebond of the at least one wirebond coupled between the first die pad of the die and a second unassigned trace.

3. The fluid ejection device of claim 1,
  wherein a first wirebond of the at least one end user-defined wirebond coupled between a first die pad of the die and a first unassigned trace provides a first function different from a second wirebond of the at least one wirebond coupled between a second die pad of the die and a second unassigned trace.

4. The fluid ejection device of claim 1, further comprising coupling at least two unassigned electrical traces with the at least one end user-defined wirebond to form a connect detect verifying that the electrical traces are coupled to control logic.

5. The fluid ejection device of claim 1, further comprising coupling the number of assigned electrical traces to control logic via the at least one wirebond.

6. The fluid ejection device of claim 1, wherein the number of assigned electrical traces are formed between the number of unassigned electrical traces.

7. The fluid ejection device of claim 1, wherein one of the at least one end user-defined wirebond couples at least one of the unassigned electrical traces to multiple die pads of the die.

8. A method of forming a cassette comprising at least one dispense head, the method comprising:
  forming the at least one dispense head comprising:
    forming a monolithic substrate;
    coupling a fluid ejection die to the substrate;
    forming a number of assigned traces on the substrate;
    electrically coupling each of the number of the assigned traces to a die pad of the fluid ejection die based on an assigned function of the cassette with regard to the respective assigned traces;
    forming a number of unassigned traces on the substrate leaving the unassigned traces uncoupled to the fluid ejection die; and
  after fabrication of the cassette, electrically coupling at least one of the unassigned traces with at least one end user-defined wirebond to the fluid ejection die thereby assigning at least one additional function to the cassette.

9. The method of claim 8, wherein electrically coupling at least one of the unassigned electrical traces with at least one end user-defined wirebond to the fluid ejection die comprises electrically coupling at least one of the unassigned electrical traces to a die pad of the fluid ejection die based on a target function of the cassette.

10. The method of claim 8, wherein the assigned and unassigned traces are formed using laser direct structuring (LDS).

11. The method of claim 8, further comprising mounting a plurality of dispense heads within a frame.

12. The method of claim 11, wherein at least two of the plurality of dispense heads are wirebonded to provide at least two different functions to their respective dispense heads.

13. The method of claim 8, further comprising preventing signals from passing to the number of unassigned traces.

14. The method of claim 8, further comprising sending a sensing signal through an unassigned trace to identify a device within the die associated with a die pad to which a wirebond of the unassigned trace is coupled.

15. The method of claim 8, further comprising:
  detecting a type of the die; and
  determining, from a look-up table, a functionality added by a placement of the wirebond between the unassigned trace and the fluid ejection die.

16. A system for ejecting a fluid into an assay comprising:
  a blank cassette comprising:
    at least one dispense head comprising:
      a substrate;
      a die coupled to the substrate;
      a number of assigned electrical traces formed on the substrate, wherein the number of assigned electrical traces are wirebonded to the die;
      a number of unassigned electrical traces formed on the substrate, wherein the number of unassigned electrical traces are not wirebonded to the die following formation of the blank cassette;
    at least one wirebond coupling at least one of the assigned electrical traces to the die assigning at least one function to the dispense head; and
    at least one end user-defined wirebond coupling at least one of the unassigned electrical traces to the die assigning at least one additional function to the fluid ejection device; and
  a controller communicatively coupled to the die to instruct the die to eject an amount of the fluid.

17. The system of claim 16, wherein a plurality of dispense heads are included within the system, the dispense heads being integrated into a frame.

18. The system of claim 16,
  wherein a first wirebond of the at least one end user-defined wirebond coupled between a first die pad of the die and a first unassigned trace provides a first function to the cassette different from the first wirebond of the at least one wirebond coupled between the first die pad of the die and a second unassigned trace.

19. The fluid ejection device of claim 16,
  wherein a first wirebond of the at least one wirebond coupled between a first die pad of the die and a first unassigned trace provides a first function different from a second wirebond of the at least one wirebond coupled between a second die pad of the die and a second unassigned trace.

\* \* \* \* \*